E. LE R. MOORE.
EDUCATIONAL DEVICE.
APPLICATION FILED JUNE 8, 1916.
1,396,379.
Patented Nov. 8, 1921.
3 SHEETS—SHEET 1.
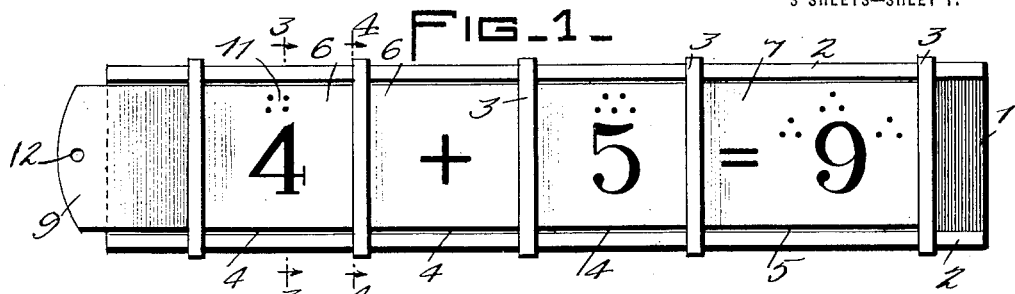
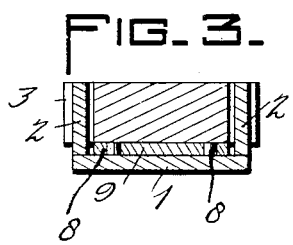
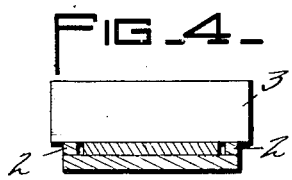
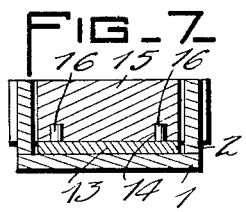
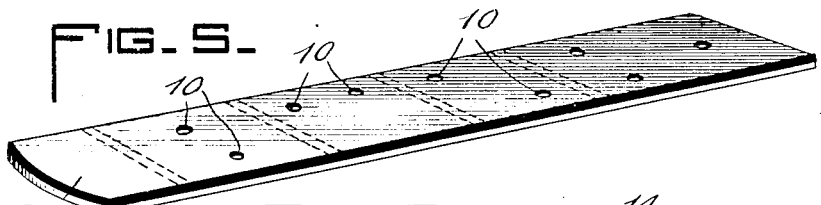
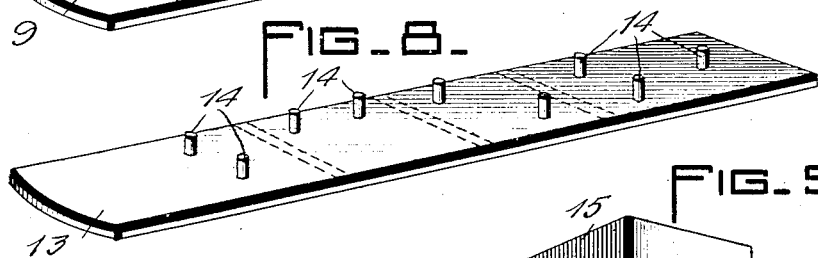
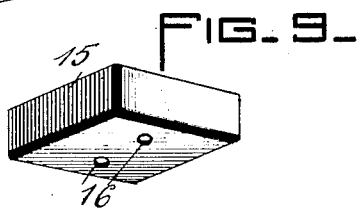
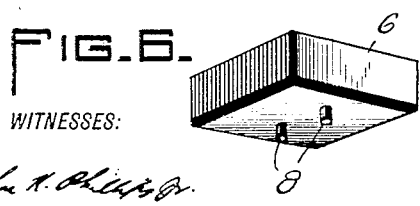
WITNESSES:
INVENTOR
EDWARD L. MOORE,
BY
ATTORNEYS

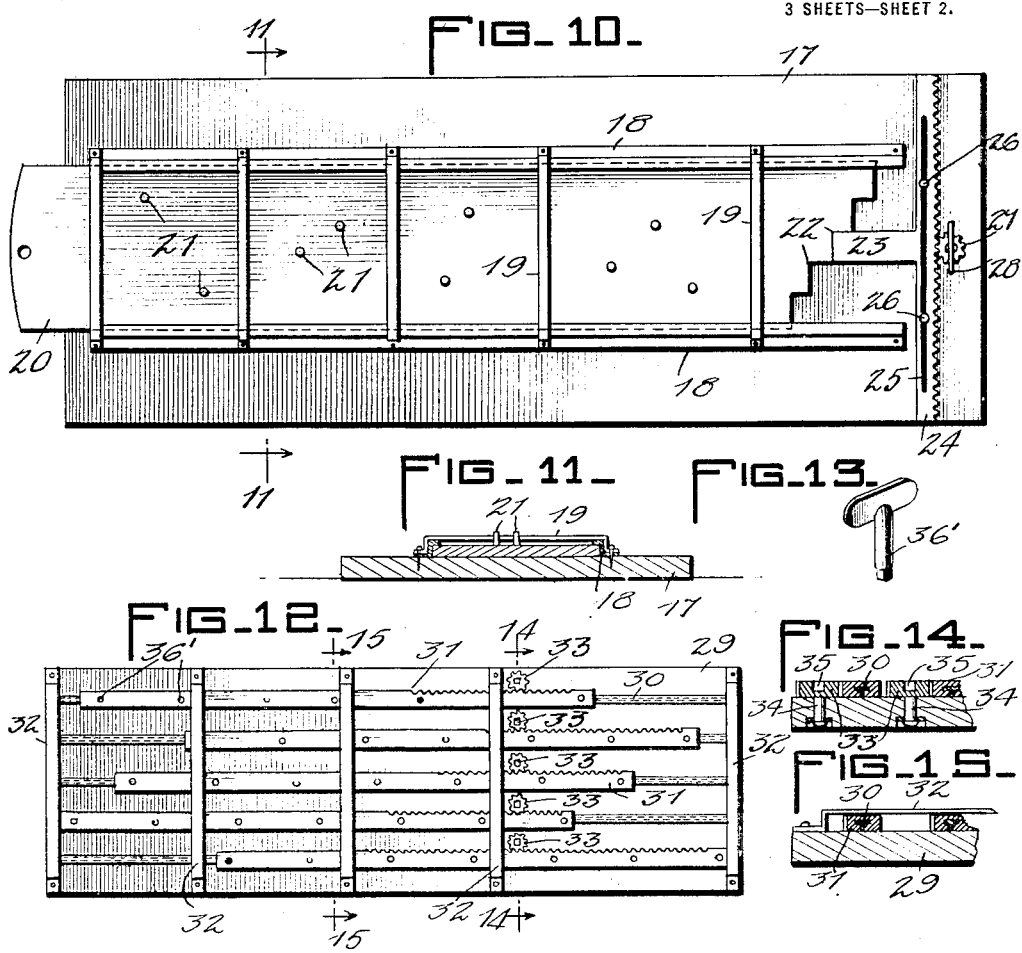

E. LE R. MOORE.
EDUCATIONAL DEVICE.
APPLICATION FILED JUNE 8, 1916.
1,396,379.
Patented Nov. 8, 1921.
3 SHEETS—SHEET 3.
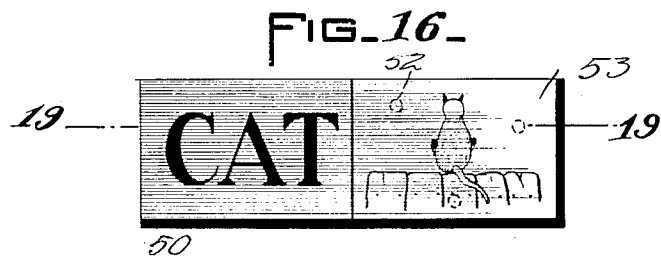
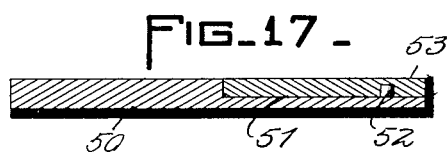
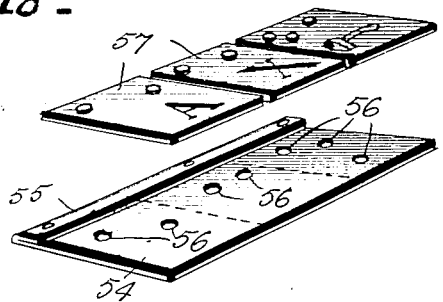
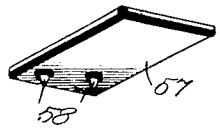
WITNESSES
John L. Thiess
W. E. Beck
INVENTOR
EDWARD L. MOORE,
BY
Munn & Co.
ATTORNEYS

UNITED STATES PATENT OFFICE.

EDWARD LE ROY MOORE, OF EUREKA, CALIFORNIA.

EDUCATIONAL DEVICE.

1,396,379.  Specification of Letters Patent.  Patented Nov. 8, 1921.

Application filed June 8, 1916. Serial No. 102,429.

*To all whom it may concern:*

Be it known that I, EDWARD LE ROY MOORE, a citizen of the United States, and a resident of Eureka, in the county of Humboldt and State of California, have invented new and useful Improvements in an Educational Device, of which the following is a specification.

My invention is an improvement in educational devices, and the invention has for its object to provide a device of the character specified for teaching children and others, number processes, spelling, and other facts or combinations of facts which may be associated together, as for instance a color and its name, a fact in history and its date, and the like, wherein the device being in effect a toy, engages the play instinct while it teaches, provides control independent of the teacher and resting entirely with the pupil, wherein a form or matrix is provided together with interchangeable elements having interengaging mechanism for insuring a predetermined arrangement of the elements, and the form or matrix to express certain associations of two or more ideas.

In the drawings:

Figure 1 is a top plan view of an embodiment of the invention,

Fig. 2 is a view of another series of elements for use in the embodiment shown in Fig. 1, Figs. 3 and 4 are sections on the lines 3—3 and 4—4 respectively of Fig. 1, each view looking in the direction of the arrows adjacent to the lines, Fig. 5 is a perspective view of the form or matrix shown in Fig. 1, Fig. 6 is a similar view of one of the interchangeable elements, Fig. 7 is a view similar to Fig. 3 showing a modified arrangement, Fig. 8 is a perspective view of the form or matrix shown in Fig. 7, Fig. 9 is a similar view of one of the interchangeable elements, Fig. 10 is a plan view of another embodiment of the invention, Fig. 11 is a section on the line 11—11 of Fig. 10 looking in the direction of the arrows adjacent to the line, Fig. 12 is a top plan view of another embodiment of the invention, Fig. 13 is a perspective view of the operating key for the form shown in Fig. 12, Figs. 14 and 15 are sections on the lines 14—14 and 15—15 of Fig. 12, each view looking in the direction of the arrows adjacent to the line, Fig. 16 is a plan view of another embodiment of the invention, Fig. 17 is a section on the line 19—19 of Fig. 16.

Fig. 18 is a perspective view of another embodiment of the invention.

Fig. 19 is a perspective view of one of the blocks shown in Fig. 18.

In Figs. 1, 3 and 4 is shown a construction wherein a trough or channel shaped holder is provided, the said holder consisting of a bottom 1 and side walls 2, and partitions 3 are arranged transversely of the holder at spaced intervals, the said partitions dividing the holder into a number of compartments 4 and 5, there being in the present instance three compartments 4 and one compartment 5. These compartments 4 and 5 are designed to receive blocks 6 and 7, each of which bears upon one face data, as for instance characters representing numbers, signs, or letters or pictures, as may be desired, and each block 6 and 7 is provided on its under side with one or more depending pins 8.

The partitions 3 do not extend to the bottom of the holder, but are spaced apart from the bottom as shown in Figs. 3 and 4, a sufficient distance to permit the passage beneath the said partitions of the slide 9, shown more particularly in Fig. 5. This slide as shown, is of approximately the same length as the holder, and the said slide is provided with series of openings 10 which are adapted to receive the pins 8 of the blocks. The slide 9 may be, if desired, marked off by lines into spaces corresponding in length to the compartments 4 and 5, and the openings 10 are arranged in these spaces, one series of the openings in each space.

The pins 8 of each block, and the openings 10 of each space on the slide, are so arranged that when the slide is in place beneath the partitions 3, only those blocks whose pins correspond in placing and arrangement to those openings of the slide which are in certain compartments, can be placed in such compartments, and the said blocks will fit in no other compartment. In the construction of Fig. 1, the block 6 bearing the numeral 4 has its pin so arranged that the said block can be placed only in the first compartment from the left. The block which bears the character plus, can be placed only in the second compartment from the left, and that block 7 which carries the numeral 9 and the equality sign, can only be placed in the last compartment. Because of this arrangement the child must place the blocks in their proper order, that is to form a correct equation.

It will be obvious that the blocks might bear other charcters than those shown in Fig. 1, as for instance in Fig. 2, where the blocks 6ª corresponding to the blocks 6 bear letters, while the block 7ª corresponding to the block 7 of Fig. 1 bears a representation whose name is spelled by the letters on the blocks 6ª when properly arranged. The block 6ª bearing the letter C must be placed in the first compartment to the left, since its pins will not fit the openings in any other compartment, and the same applies to the block 7ª bearing the representation of a cat. With this arrangement the child must arrange the first three blocks 6ª in proper order to spell cat, and the block 7ª shows the representation of the cat. It will be obvious that many other combinations and arrangements might be made both in simple sums and in word spelling.

If desired, the blocks bearing the numeral, may have dots on their outer faces showing the number of units in each numeral, these groups of dots being indicated at 11. Each slide 9 has one end rounded as shown, and this end may be provided with an opening indicated at 12 to permit the slide to be filed away on a hook or the like.

In Figs. 7, 8 and 9, the slide 13 is provided with groups 14 of upstanding pins, which may be arranged in the same manner as the openings 10, and with this arrangement of slide the blocks 15, which may have the representations of numerals, letters, or any other desired matter, have openings 16 at their under sides for receiving the pins 14. The arrangement of the openings and the pins is such that only certain predetermined blocks may be arranged in certain predetermined compartments. Any number of slides may be provided, with blocks to correspond, each slide and its blocks representing a certain association of facts.

In Figs. 10 and 11 a base plate 17 is provided, and upon this plate is arranged a pair of spaced parallel guides 18. The guides are connected at spaced intervals by cross bars 19, which serve the same purpose as the partitions 3, dividing the space between the guides into compartments. A slide 20 is mounted to move in the guide longitudinally of the plate. This slide is provided with series of upstanding pins 21, the members of each series being arranged differently from the members of the other series and the slide has one end notched to form steps or gradations 22. A movable stop bar is provided for limiting the movement of the slide in one direction, and this bar 23 is in the form of a lateral extension from the rack bar 24 which is mounted to move transversely of the plate.

The rack bar has a longitudinally extending slot 25 which is engaged by headed pins 26 on the plate. The teeth of the rack bar are at the opposite edge from the stop bar 23 and these teeth mesh with a pinion 27 journaled on the plate and provided with a head or finger piece 28 for turning the same. By rotating the pinion 27, the rack bar 24 may be moved transversely of the plate for positioning the stop element in the line of travel of the selected step 22 for limiting the movement of the slide 20 in one direction.

In the above described embodiment, a single slide may be used for a number of facts or associations, and a separate slide is not essential for each group of associated facts. For instance, the slide shown having five gradations might be used for five groups, and by making the gradations greater or less in number, a greater or less number of groups might be provided for each slide.

In Figs. 12 to 15 inclusive, a number of slides is provided. In this arrangement the plate 29, which is the base, is provided with a series of longitudinally extending T-shaped guides 30 and a slide 31 is mounted on each guide. Each of the said slides 31 has a T-shaped longitudinally extending passage for receiving the guide, and each slide has in addition, a series of rack teeth on one end. The upper surface of the plate or base is divided into compartments by cross bars 32, and a pinion 33 is journaled on the plate adjacent each slide, the teeth of each pinion engaging the teeth of the adjacent slide. These pinions are journaled on stub shafts 34 which are mounted in the plate, and each pinion has a polygonal opening 35 in its upper face. A key 36 is provided for engaging the openings, and by means of the key the slide may be moved longitudinally of its guide. Each slide is provided with series of upstanding pins 36', which are spaced differently in the several compartments formed by the cross bars 32, and it will be obvious that each slide may be used for a number of groups by arranging the openings of the blocks so that the slide must be positioned in a predetermined manner before the block will fit within the compartment. It will be evident that in either Figs. 10 or 12, the slide might be provided with openings and the blocks with pins, instead of providing the slides with pins and the blocks with openings.

In the embodiment of the invention shown in Figs. 16 and 17, the support 50 has one end rabbeted as indicated at 51 on the upper face, and this support or base 50 bears upon the unrabbeted portion of the upper face a word, "Cat" in the present instance. The rabbeted portion of the base is provided with a series of upstanding pins 52 and the blocks 53 which bears the associated data, in the present instance the representation of a cat, is provided with openings for receiving the pins 52. In this embodiment, it will be understood that each support or matrix 50 bears certain data at one end, associated with the data on that block 53 which has the openings arranged to receive the pins of the rabbeted portion. Only that block 53 bearing the data associated with that on the matrix 50, can be placed on the rabbeted portion.

In Figs. 18 and 19, the support or matrix 54 has at one side edge of its upper face, a longitudinally extending rib 55 formed in the present instance by bending over the material of the base or matrix upon the upper face thereof at one side edge, and securing the bent over portion in place by rivets or the like. This base or matrix is provided with three series of openings 56, the openings of each series being arranged in a different manner to the openings of the other series. The matrix in the present instance is designed to receive three blocks 57 and these blocks have pins 58 extending from their under faces, which are adapted to engage the openings 56. The arrangement of the pins 58 of each block corresponds to the arrangement of the openings of that series with which the pins are adapted to engage, insuring that each block of the series will be properly placed with respect to the matrix. In the present instance one block bears the letter A, another the letter X, while the third block bears the representation of an ax. These blocks can be associated on the matrix only in a certain predetermined manner, that is in the proper way to spell "ax" with the representation of the ax following.

I claim—

1. Apparatus of the character specified consisting of a plate having block receiving compartments arranged alongside of each other, slides having guided movement longitudinally of the plate at the bottoms of the compartments, each slide having a series of upstanding pins at each compartment, and the arrangement of the series in each compartment being different from the arrangement in the other compartments, blocks having openings in their under sides for receiving the pins, one of the compartments being of greater size than the others, and the block for the said compartment being of greater size than the other blocks and the smaller blocks bearing data on the upper faces adapted to be associated, and the larger block bearing data showing the results of such association.

2. Apparatus of the character specified consisting of a plate having block receiving compartments arranged alongside of each other, slides having guided movement longitudinally of the plate at the bottoms of the compartments, each slide having a series of upstanding pins at each compartment, and the arrangement of the series in each compartment being different from the arrangement in the other compartments, and blocks having openings in their under sides for receiving the pins.

3. Apparatus of the character specified consisting of a plate having block receiving compartments arranged alongside of each other, blocks for the compartments slides having guided movement longitudinally of the plate at the bottoms of the compartments, the blocks and the slides having interengaging mechanism, and the arrangement of said mechanism being different in each compartment, sundry of the blocks bearing data on their upper faces adapted to be associated to give predetermined results, and others of the blocks bearing data indicating such results.

4. Apparatus of the character specified consisting of a plate having block receiving compartments arranged alongside of each other, blocks for the compartments, slides having guided movement longitudinally of the plate at the bottoms of the compartments, the blocks and the slides having interengaging mechanism, and the arrangement of said mechanism being different in each compartment.

5. Apparatus of the character specified comprising a support having a compartment, slides movable longitudinally of the support and extending into the compartment, blocks adapted to fit within the compartment, the slides and the blocks having interengaging mechanism and the mechanism of the blocks being arranged in such manner that the mechanism of the slides must correspond therewith before the blocks may be seated in the compartment.

6. Apparatus of the character specified, consisting of a frame having block-receiving compartments arranged alongside of each other, a series of removable slides having guided movement longitudinally of the frame at the bottoms of the compartments, and a series of changeable blocks adapted to seat in the compartments, each slide having a series of upstanding pins at each compartment, and the arrangement of the series of pins on each slide different from the arrangement on other slides, the blocks having openings in their under sides sundry of which are adapted for receiving the pins, the blocks bearing on their upper sides data adapted to be associated in a predetermined order.

7. Apparatus consisting of a form having element receiving compartments arranged alongside of each other, a series of removable plates adapted to fit into the bottoms of the compartments, and a series of removable elements adapted to seat in the compartments and bearing data adapted to be associated, each plate having a mechanism at each of the compartments, said mechanism adapted to engage a corresponding mechanism on a certain one of the elements but no other, said mechanisms being between the plates and elements, and said mechanisms adapted to insure the placing of said elements upon said frame in a predetermined order.

8. Apparatus comprising a frame having compartments, slides fitting at the bottoms of said compartments, blocks adapted to fit into said compartments and said blocks bearing data adapted to be associated, the slides and blocks having interengaging mechanism between them, and the mechanism of the slides being arranged in such manner that the mechanism of the block must correspond with that of the slide before the block can be seated in the compartment.

9. Apparatus consisting of a form having element receiving compartments, slides having guided movement longitudinally of the form, each slide having a series of upstanding pins, the arrangement of the pins being different for each slide, the elements having openings in their under sides, sundry of which are adapted for receiving the pins, the elements bearing on their faces data adapted to be associated.

10. In combination, a frame, a series of slides adapted to fit into said frame, and a series of blocks adapted to fit into the frame upon the slides, each of the slides and the blocks having differently arranged co-acting means enabling certain of the blocks to engage the means on the slides in certain predetermined arrangement and to prevent their arrangement except at the proper predetermined arrangement.

11. Apparatus consisting of a form, a series of slides adapted to engage the form, and a series of blocks adapted to engage the form in combination with the slides, each of the slides and the blocks having differently arranged co-acting means enabling certain of the blocks to engage the means on the slides in certain predetermined arrangement and to prevent their arrangement except at the proper predetermined arrangement, said interengaging means different for different slides.

12. In combination, a support, a base plate having a series of parallel guides on its upper face, a slide mounted to move on each guide, the upper face of the plate being sub-divided into spaces or compartments by transverse cross-bars, and means for moving each slide longitudinally of the support, and series of interchangeable elements adapted to seat in the compartments and having interengaging mechanism with the slides for insuring predetermined arrangement of said elements in connection with each slide.

13. Apparatus consisting of a frame having block-receiving compartments, a series of slides having guided movement in the compartments, and a series of changeable blocks adapted to seat in the compartments, each slide having a series of pins with an arrangement different from the arrangement on other slides, the blocks having openings in their under sides sundry of which are adapted for receiving the pins, the blocks bearing on their upper sides, data adapted to be associated in a predetermined way.

14. In combination, a frame and a series of pieces adapted to be placed upon the frame, said pieces of two varieties, the pieces having a co-acting means between the pieces of the different varieties allowing the engaging of certain predetermined pieces of the second variety by a given piece of the first variety, and preventing the engaging of other pieces of the second variety by that same piece of the first variety.

15. Apparatus consisting of a frame, pieces of two varieties having interengaging means upon their adjacent faces to insure that the pieces can be arranged only in a certain predetermined order, and the pieces of the undermost variety determining the order of arrangement of the pieces of the uppermost pieces, the interengaging means being between the pieces of the uppermost and the undermost variety, the pieces of the uppermost bearing data adapted to be associated in a predetermined order.

16. Apparatus consisting of a frame, pieces of two varieties having interengaging means upon their adjacent faces to insure that the pieces can be arranged only in a certain predetermined order, and the pieces of the undermost variety determining the order of arrangement of the pieces of the uppermost pieces, the interengaging means being between the undermost and the uppermost variety of pieces.

17. In combination, a frame and a plurality of series of pieces adapted to be placed upon the frame, the pieces of one series being adapted to be arranged upon the pieces of the other series, each piece of each series having means coöperating with similar means on the corresponding piece of the other series constraining the pieces of the uppermost series of the pieces to be placed in certain predetermined arrangement and to prevent their arrangement except in the proper predetermined order.

18. Apparatus comprising a frame and a series of interchangeable pieces adapted to coöperate with the frame, the pieces having means for insuring that they will be placed on the frame in a predetermined order, said means being hidden after the pieces are placed.

19. Apparatus comprising a matrix, and elements for engaging the matrix, said matrix and elements having means for insuring the placing of predetermined elements in predetermined position, said means being hidden when the elements are in place.

20. In combination, a plurality of series of pieces adapted to be placed together, the pieces of one series being adapted to be arranged upon the pieces of another series, each piece of each series having means coöperating with similar means on the corresponding pieces of the other series, constraining the pieces of one series to be placed in a certain predetermined order upon the pieces of the other series and to prevent their arrangement in any order except the proper predetermined order.

21. In combination, a plurality of series of parts adapted to be placed together, the parts of one series being adapted to be arranged upon the parts of another series, each piece of each series having means coöperating with similar means on the corresponding part of the other series, constraining the parts of one series to be placed in a certain predetermined order upon the parts of the other series, all said parts of a given series being of the same outline.

22. In combination, a plurality of series of similarly shaped parts, the members of one series having pegs and the members of another series having holes, both pegs and holes being so arranged that only certain predetermined members of one series can be placed upon a given member of another series.

EDWARD LE ROY MOORE.

Witnesses:
 Delos A. Mace,
 A. J. Monroe.